(12) United States Patent
Dettinger et al.

(10) Patent No.: US 7,606,791 B2
(45) Date of Patent: Oct. 20, 2009

(54) INTERNAL PARAMETERS (PARAMETERS AGING) IN AN ABSTRACT QUERY

(75) Inventors: Richard D. Dettinger, Rochester, MN (US); Daniel P. Kolz, Rochester, MN (US); Cale T. Rath, Byron, MN (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 10/860,417

(22) Filed: Jun. 3, 2004

(65) Prior Publication Data

US 2006/0004707 A1 Jan. 5, 2006

(51) Int. Cl.
*G06F 7/00* (2006.01)
*G06F 17/30* (2006.01)
*G06F 17/00* (2006.01)

(52) U.S. Cl. .................. 707/3; 707/4; 707/2; 707/102
(58) Field of Classification Search .................. 707/3, 707/100
See application file for complete search history.

(56) References Cited

U.S. PATENT DOCUMENTS

| | | | |
|---|---|---|---|
| 6,725,227 B1 | 4/2004 | Li | |
| 6,763,349 B1 * | 7/2004 | Sacco | 707/3 |
| 6,996,558 B2 * | 2/2006 | Dettinger et al. | 707/4 |
| 7,146,409 B1 * | 12/2006 | Bushee et al. | 709/219 |
| 2002/0027567 A1 * | 3/2002 | Niamir | 345/738 |
| 2004/0103088 A1 * | 5/2004 | Cragun et al. | 707/3 |
| 2004/0220914 A1 * | 11/2004 | Cheung et al. | 707/3 |
| 2005/0086239 A1 * | 4/2005 | Swann et al. | 707/100 |
| 2005/1023487 * | 10/2005 | Yu | 707/3 |

OTHER PUBLICATIONS

U.S. Appl. No. 10/083,075, filed Feb. 26, 2002, "Application Portability and Extensibility Through Database Schema and Query Abstraction".
U.S. Appl. No. 10/094,531, filed Mar. 8, 2002, "Graphical User Interface to Build Event-Based Dynamic Searches or Queries Using Event Profiles".

* cited by examiner

*Primary Examiner*—Neveen Abel Jalil
*Assistant Examiner*—Raheem Hoffler
(74) *Attorney, Agent, or Firm*—Patterson & Sheridan, LLP

(57) ABSTRACT

The present invention provides for aging queries. Queries are aged by, for example, adding temporal conditions to the queries. The temporal conditions include temporal fields having a time-based association with one or more other conditions of the respective queries. In one embodiment, each temporal condition includes a temporal field and corresponding time value, where the time value is set to the time when the respective query was last run.

21 Claims, 9 Drawing Sheets

INTERNAL PARAMETERS (PARAMETERS AGING) IN AN ABSTRACT QUERY

CROSS-REFERENCE TO RELATED APPLICATIONS

This application is related to commonly owned, co-pending U.S. patent application Ser. No. 10/083,075, entitled "Application Portability And Extensibility Through Database Schema And Query Abstraction," filed Feb. 26, 2002, and commonly owned, co-pending U.S. patent application Ser. No. 10/094,531, entitled "Graphical User Interface To Build Event-Based Dynamic Searches Or Queries Using Event Profiles", filed Mar. 08, 2002, which are both incorporated by reference in their entirety.

BACKGROUND OF THE INVENTION

1. Field of the Invention

The present invention generally relates to data processing and more particularly to aging queries.

2. Description of the Related Art

Databases are computerized information storage and retrieval systems. The most prevalent type of database is the relational database, a tabular database in which data is defined so that it can be reorganized and accessed in a number of different ways.

Regardless of the particular architecture, a requesting entity (e.g., an application or the operating system) demands access to a specified database by issuing a database access request, or query. Such queries may include, for instance, simple catalog lookup requests or transactions and combinations of transactions that operate to read, change and add specified records in the database. The term "query" denominates a set of commands for retrieving data from a stored database. Queries take the form of a command language that lets programmers and programs select, insert, update, find out the location of data, and so forth. One well-known high-level query language is the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates.

Queries are constructed of query conditions that serve to filter results returned from the query. Accordingly, a query may be thought of as group of filters put together to sift out irrelevant data and return only the data of interest. Often, it may be desirable to modify one or more of the query conditions and re-execute the query to determine the effects of the query condition on the results returned. For example, for a given query, the user may desire to see only that data added to a database since the last time the query was run. In the context of life sciences, consider a researcher tracking the effects of a disease over the course of a two year study. The researcher may periodically wish to check that there are not new candidates that can be brought into the study. The periodic collection of new data is required in other environments as well, such as in financial reporting, batch task distribution and order placement.

Conventionally, to limit query results to data added since the last execution of a query, requires reconstructing the query. For example, an additional temporal condition or conditions may need to be added to the query, whereby the query is restricted to specific time domain. However, this approach requires that the user track when queries were last run and have sufficient proficiency with queries in order to properly configured the queries with the proper temporal conditions.

Therefore, there is a need for an approach facilitating time-restricted queries configured to return results limited to those results that satisfy a given query and were added to the database since the last execution of the query.

SUMMARY OF THE INVENTION

The present invention provides for aging queries. Queries are aged by, for example, adding temporal conditions to the queries.

In one embodiment, a computer-implemented method performs queries based on aging result fields. A first query comprising one or more conditions each containing one or more result fields is executed. A timestamp indicative of a time at which the first query is executed is stored. A first result set is returned for the first query. At least one of the result fields is designated as an aging parameter, wherein each result field designated as an aging parameter has an associated time value field. For each designated aging parameter, a temporal condition is programmatically added to the first query to produce a second query; wherein each temporal condition comprises the respective associated time value field and a value corresponding to the timestamp, whereby results returned for the respective aging parameter are limited to those having time values more recent than the timestamp.

In another embodiment, a computer-implemented method for performing queries based on aging result fields includes executing a first query comprising a result field and recording a time at which the first query is executed. After executing the first query at the recorded time: a request is received to re-execute the first query with a temporal restriction on the result field, whereby results returned are limited to those satisfying the first query and not returned in the previous execution of the first query. Accordingly, the first query is programmatically reconstructed to produce a second query which, when executed, limits the results returned to those satisfying the first query and not returned in the previous execution of the first query.

Yet another embodiment provides a computer-implemented method for performing queries based on aging result fields. A request is received to execute a query having a result field and a temporal condition limiting results returned for the result field to a specified time domain. A time value indicative of when the query was last executed is determined and the temporal condition is updated with the determined time value. The query is then executed.

Still another embodiment provides a computer system having a database; an aging parameter table in which each row comprises a query and a time value indicating the time at which the query was last executed, wherein the query has a result field capable of being temporarily restricted; and a query manager. The query manager is configured to: (i) update the time value for each execution of the query; and (ii) add a temporal condition to the query, the temporal condition being applied to the result field and including the time value for the immediately previous execution of the query, whereby results returned are limited to those satisfying the query and not returned in the immediately previous execution of the query.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
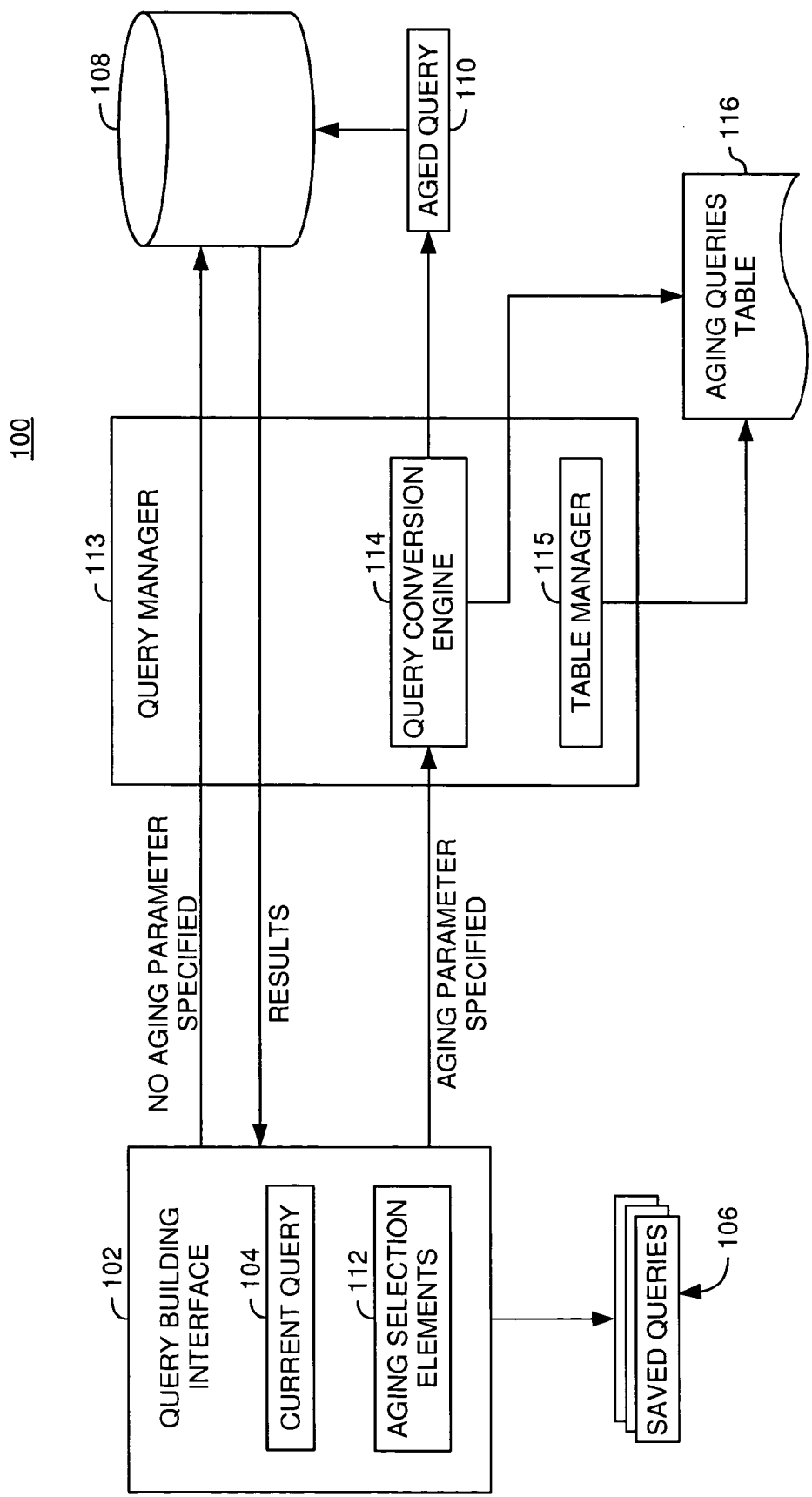
FIG. 1 is a block diagram of a query building interface for submitting queries and a query manager for converting the queries into time-restricted queries.

The present invention provides for aging queries. Queries are aged by, for example, adding temporal conditions to the queries. The temporal conditions include temporal fields having a time-based association with one or more other conditions of the respective queries. In one embodiment, each temporal condition includes a temporal field and corresponding time value, where the time value is set to the time when the respective query was last run.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention may provide numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the invention may be described with reference to a database management system (DBMS) structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). However, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown.

Further, embodiments of the invention can be implemented in any appropriate hardware/software configuration. In this regard, embodiments of the present invention can apply to any comparable hardware configuration, regardless of whether the computer systems are complicated, multi-user computing apparatuses, single-user workstations, or network appliances that do not have non-volatile storage of their own. One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 shows an illustrative query building and execution environment 100. Queries are constructed and submitted for execution via a query building interface 102. The query building interface 102 may provide one or more interfaces to a user (e.g., a human user or other application) allowing the specification of parameters to be used in generating an abstract query. For some embodiments, the interfaces may include a graphical user interface (GUI), such as the ones shown in FIGS. 3A-B and 4. In a particular embodiment, the GUI content is hypertext markup language (HTML) content which may be rendered on a computer with a browser.

The query being prepared for execution is shown as the "current query" 104 in the query building interface 102. The current query 104 may represent a query composed according to user input (e.g., keystrokes) during a current user session or one of a plurality of saved queries 106 retrieved from storage. Ultimately, the current query 104 is submitted for execution. In one embodiment, a query manager 113 facilitates aspects of query execution. The query manager 113 may be, for example, a component of a database management system. Alternatively, the query manager 113 may be an external application.

In any case, queries submitted by the query building interface 102 are executed against a database 108. The database 108 is representative of any collection of data which may be interrogated by requests (i.e., queries). In a particular embodiment, the database 108 is a relational database under the management of a database management system. Although only one database is shown, is contemplated that queries may be submitted for execution against one or more of a plurality of databases in a federated database environment. In general, query building interface 102 is configured to submit any form of known or unknown queries, including a type of query referred to herein as an "aged query" 110. An aged query is a time-restricted form of a previously submitted (executed) query. A time restriction is imposed on the previously submitted/executed query in the form of a temporal condition. As defined herein, a temporal condition is a query condition that limits a specified time-restrictable result field of the query to a specific time domain. Consider, for example, the following two queries:

Query A
SELECT Patient ID, Test Value FROM Demographic, Labtest WHERE LabTest=Hemoglobin count and TestResult>80

Query B (Aged Query)
SELECT Patient ID, Test Value FROM Demographic, Labtest WHERE LabTest=Hemoglobin count and TestResult>80 and TestDate>X Query B is substantially the same as Query A except that a temporal condition, TestDate>?, has been added to limit the result fields, LabTest and TestResult, both time-restrictable result fields, to a specific time domain. In this example, TestDate is a time value field and "?" is a variable that can be set to a particular value according to a desired result. TestDate is associated with LabTest and TestResult in the sense that a given test is performed on a certain calendar date, which date can be stored as a value in the Labtest table (i.e., in the TestDate column). Thus, the Labtest table has a LabTest column, a TestResult column and a TestDate column. For purposes of describing specific embodiments of the invention, the LabTest field and TestResult field are referred to as Aging Parameters. More generally, an Aging Parameter is a field (e.g., table column) that can be aged by virtue of an association to a temporal field. A temporal field is one that it is associated with the Aging Parameter field in a manner that allows that field to be aged with respect to the temporal field. In the above example, the TestDate field is a temporal field of the LabTest field because the TestDate field values specify dates on which various lab tests were performed, whereby the LabTest field values can be restricted to certain time periods. TestDate is also a temporal field with respect to TestResult, since the test result is a value for test which occurred on a specific test date. Thus, a single temporal field may be used to age one or more Aging Parameter fields. Further, in some cases, more than one temporal field is needed for a given query. Generally, more than one temporal field is needed where the result fields of the given query are unrelated. For example, assume a query having the result fields TestResult and DiagnosisResults. In this case, two temporal fields are needed: the TestDate temporal field for the TestResult field and the DiagnosisDate temporal field for the DiagnosisResult field.

In a particular example, the temporal condition limits the time-restrictable result field to the time period between the current time and the time at which the query was last run. Thus, in the above example, "X" could be set to the date on which Query A was last run. However, more generally, the limits of the time period may be arbitrarily selected, e.g., by a user. Further, it should be understood that the Aging Parameter field and the temporal field may be of arbitrary granularity/resolution. For example, test dates may be given as Year/Month/Day, while other time values may be given as Year/Month/Day/Hours/Minutes. It should now also be clear that the temporal field values are essentially timestamps for the records in which they are contain, and that the database(s) containing these records is maintained and updated regularly in order to accommodate certain types of querying described herein. For example, failure to keep the database updated on a regular basis may result in the insertion of records that predate (per their respective temporal fields) the date on which Query A was last run, in which case Query A will not return any results containing values from those records. For the same reason, some time-based fields are not well-suited for use as temporal fields. For example, an Age field is a time-based field but, with the exception of records pertaining to newborn babies, is not a good candidate for a temporal field. This is because it is possible to add records to a database for people having birthdays predating a previously run query designed return all new records added to the database since the previous execution of the query. In this example, a more appropriate temporal field would be a DateEntered field indicating the date on which the record was entered into the database, assuming such a field was included with the records.

A decision to execute an aged query may be implemented by invoking appropriate aging selection elements 112 of the query building interface 102. In one embodiment, the query building interface 102 is a graphical user interface in which case the aging selection elements 112 may be any of a variety of known and unknown graphical user interface elements, such as checkboxes, drop-down menus, text fields and the like. A specific embodiment of the aging selection elements 112 will be described below with respect FIGS. 3A-B and FIG. 4. Using the aging selection elements 112, a user may cause an aged query 110 to be submitted for execution by specifying one or more result fields of the current query 104 as Aging Parameters. Accordingly, FIG. 1 illustrates that queries with "No Aging Parameter Specified" and queries with "Aging Parameter Specified" may be submitted for execution against the database 108.

Queries with aging parameters specified are provided to a query conversion engine 114 of the query manager 113. In one embodiment, the query conversion engine 114 is a query engine of a database management system. However, it is also contemplated that the query conversion engine 114 is a function of an external application. In any case, the query conversion engine 114 is configured to restructure the current query 104 according to the selected aging parameter(s). More specifically, the conversion engine 114 appends an appropriate temporal condition to the current query 104, whereby the aged query 110 is produced. Although FIG. 1 shows the aged query 110 being submitted for execution against the database 108 immediately after being output from the query conversion engine 114, it is contemplated that the resulting aged query 110 is first returned to the query building interface 102. In this way, a user may view and/or adjust the aged query 110 before submitting it for execution. Assuming no further aging parameters are specified, the aged query 110 could then be submitted directly for execution without again invoking the query conversion engine 114.

Figure 2:
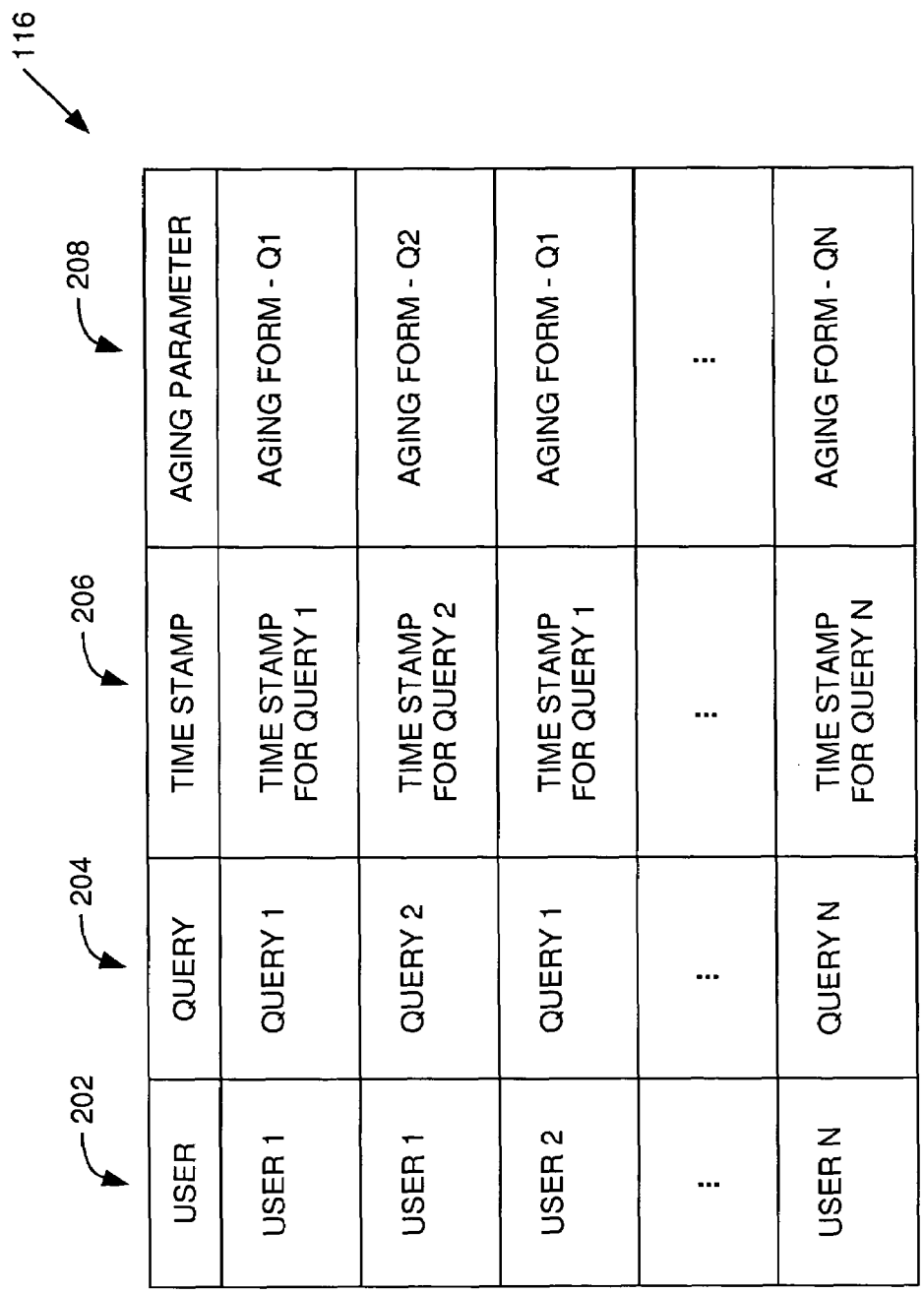
FIG. 2 is a representative Aging Queries Table.

In one embodiment, the query conversion engine 114 determines the temporal condition with reference to an aging queries table 116 that is managed by a table manager 115 of the query manager 113. In general, the aging queries table 116 may be representative of any data structure whether persistently stored on a storage device (e.g., a hard disk) or temporarily stored in memory. For purposes of illustration only, the aging queries table 116 will be described as a persistent object. An exemplary embodiment of the aging queries table 116 is shown in FIG. 2. The table 116 generally includes a plurality of columns and rows, wherein each row is a record.

Illustratively, the aging queries table 116 includes a user column 202, a query column 204, a time stamp column 206 and an aging parameter column 208. The individual values in the user column 202 identify specific users, e.g., by name or by a user ID. The query column 204 contains the various queries stored by respective users. For example, the first and second row of the table 116 are records for Query 1 and Query 2, respectively, for User 1. The timestamp column 206 contains timestamps for the last execution of the respective queries. As used herein, a "timestamp" is any time indication value, and is not limited to any particular technical definition associated with the term "timestamp" suggestive of format or data type. Accordingly, in different embodiments, the resolution of the timestamps contained in timestamp column 206 may be different. For example, in one embodiment, the timestamps may have a resolution on the order of seconds; in another embodiment the timestamps may have a resolution on the order of days. The aging parameter column 208 contains specified fields of the respective queries that are specified as aging parameters used by the query conversion engine 114, together with the respective time stamps, to generate temporal conditions for the queries.

In operation, a record may be created in the table 116 upon submission of a user request to execute a query (i.e., the first time a user requests execution of a given query). The time at which the query is executed is recorded as a corresponding time stamp in the time stamp column 206. In one embodiment, the timestamps are updated for each subsequent execution of the respective queries. It is contemplated that any records created for a given session, may either be discarded after the session or saved, in which case the records will be available when the user runs the respective queries again in future sessions. Whether or not records are saved or deleted, may be a user-configurable option.

It is emphasized that the table 116 shown in FIG. 2 is merely illustrative, and other embodiments are contemplated. For example, in a single user environment the user column 202 may not be necessary. Is also contemplated that the user column 202 may be unnecessary in a multi-user environment, such as for example, where users share tasks. That is, each time and a user runs a query, they desire all the entries are new since the last person ran that query. In another embodiment, the aging parameter column 208 may not be necessary, such as when the aging parameter is specified at the time of each execution. The latter embodiment assumes that a timestamp is nevertheless saved for queries, even though an aging parameter has not been specified for the queries.

Figure 3A:
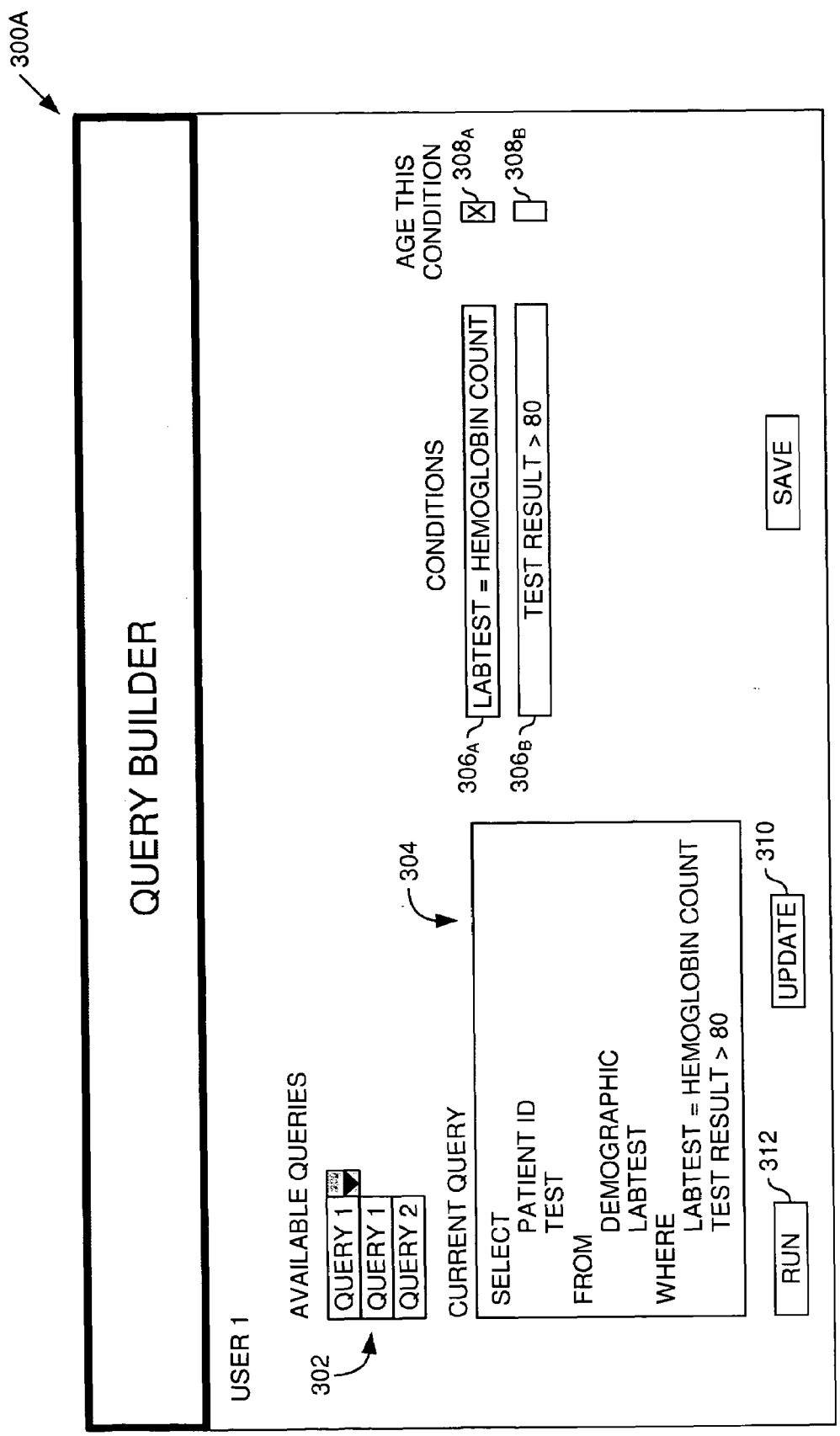
FIG. 3A is a first representative screen of the query building interface of FIG. 1, and showing a first query.

Referring now to FIG. 3A, an illustrative query builder screen 300A of the query building interface 102 is shown. The screen includes a Current Query window 304 in which a user may compose and edit queries. The query displayed in the window 304 is considered the "current query" 104 described with respect to FIG. 1. The screen 300 also includes a drop-down list 302 from which a user may select any of the saved queries 106. Illustratively, the user selects Query 1 from the drop-down list 302. The selected query is then shown in any Current Query window 304. The individual conditions of the selected query are shown separately in respective conditions text fields. Accordingly, a first condition "LabTest=hemoglobin count" is shown in a first condition text field 306A and a second condition "TestResult>80" is shown in a second condition text field 306B. The screen 300 is configured with appropriate selection elements whereby a user may designate one or more of the query conditions to age. In the illustrative example, these selection elements are in the form of checkboxes 308A, 308B associated with the respective condition text fields. Illustratively, the user has elected to age the first condition, "LabTest=hemoglobin count".

Having selected the condition(s) to age, the user may then click the Update button 310 to view the resultant aged query in the Current Query window 304. That is, by clicking the Update button 310, the user invokes the query conversion engine 114 to access the aging queries table 116 and determine the timestamp for the selected query (in this example, Query 1 for User 1). The query conversion engine 114 then determines and appends the appropriate temporal field to the selected query and returns the resultant aged query to the query building interface 102. An illustrative aged query consistent with the present example is shown in the Current Query window 304 of FIG. 4. The user then has the option of making further adjustments to the aged query. For example, the user may manually change the time value (X) associated with the time value field (TestDate) of the temporal condition. When the user is satisfied with the query, the user submits the query for execution by clicking the Run button 312. Results for the executed query may be displayed in an appropriate results screen (not shown).

Figure 3B:
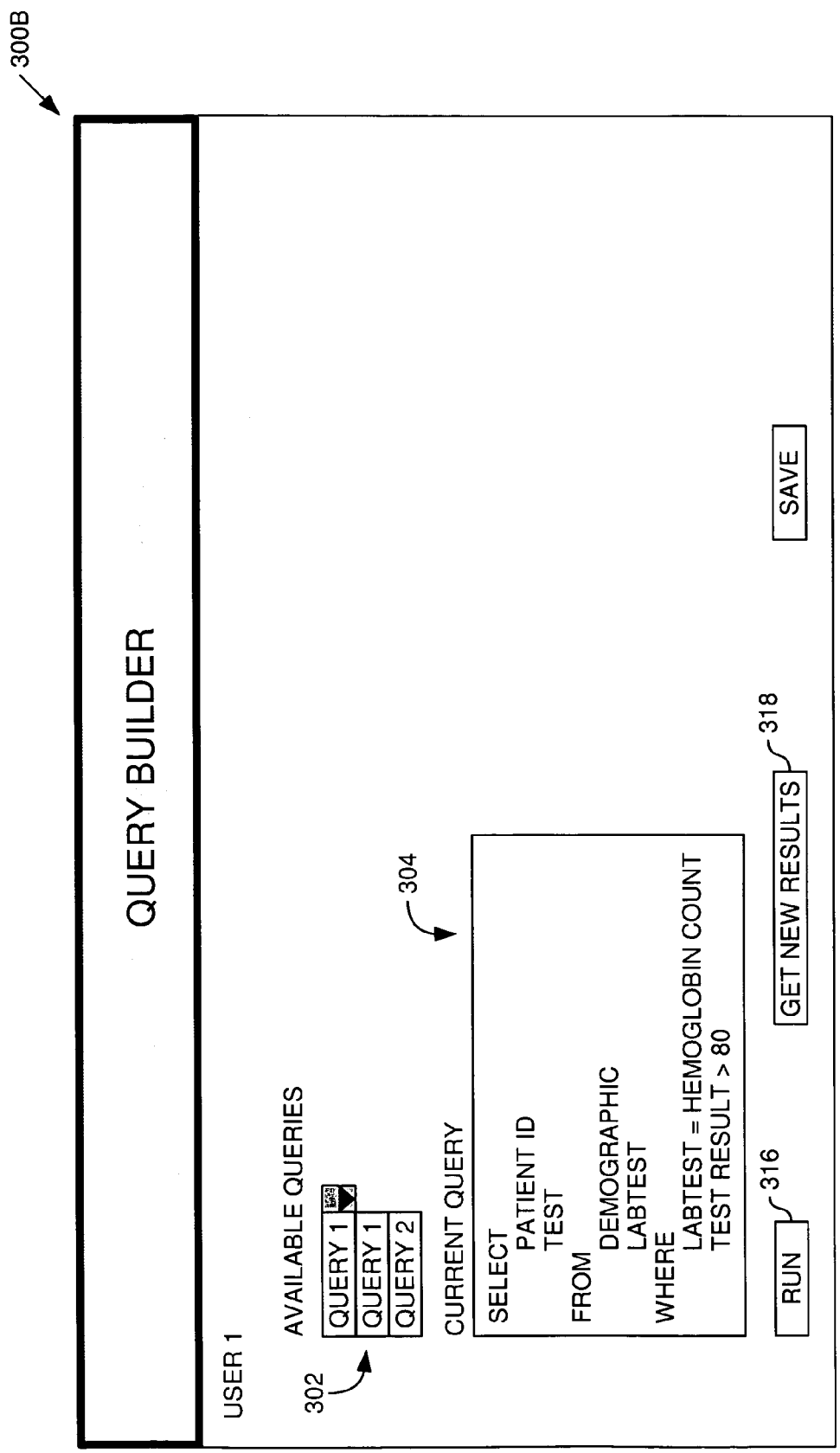
FIG. 3B is a second representative screen of the query building interface of FIG. 1, and showing a first query.

In another embodiment, condition aging is made relatively transparent to the user. A representative query builder screen 300B supporting such an embodiment is shown in FIG. 3B. Fields are configured as having aging support and the information in the table 116 of FIG. 2 is tracked as described above. After a query has been run, the user is given the option of either running the query again without aging (in which case all available results are returned), by clicking a first button 316, or run it specifically to get only new results, a function that may be externalized via an appropriately labeled second button, e.g., a "Get New Results" button 318. When the "Get New Results" button 318 is selected, the query is configured with the appropriate temporal fields and run, as described above. In such an environment ageable fields are not made known to the user via the query building interface 102, and the user is not given the option of selecting which fields to age.

Figure 4:
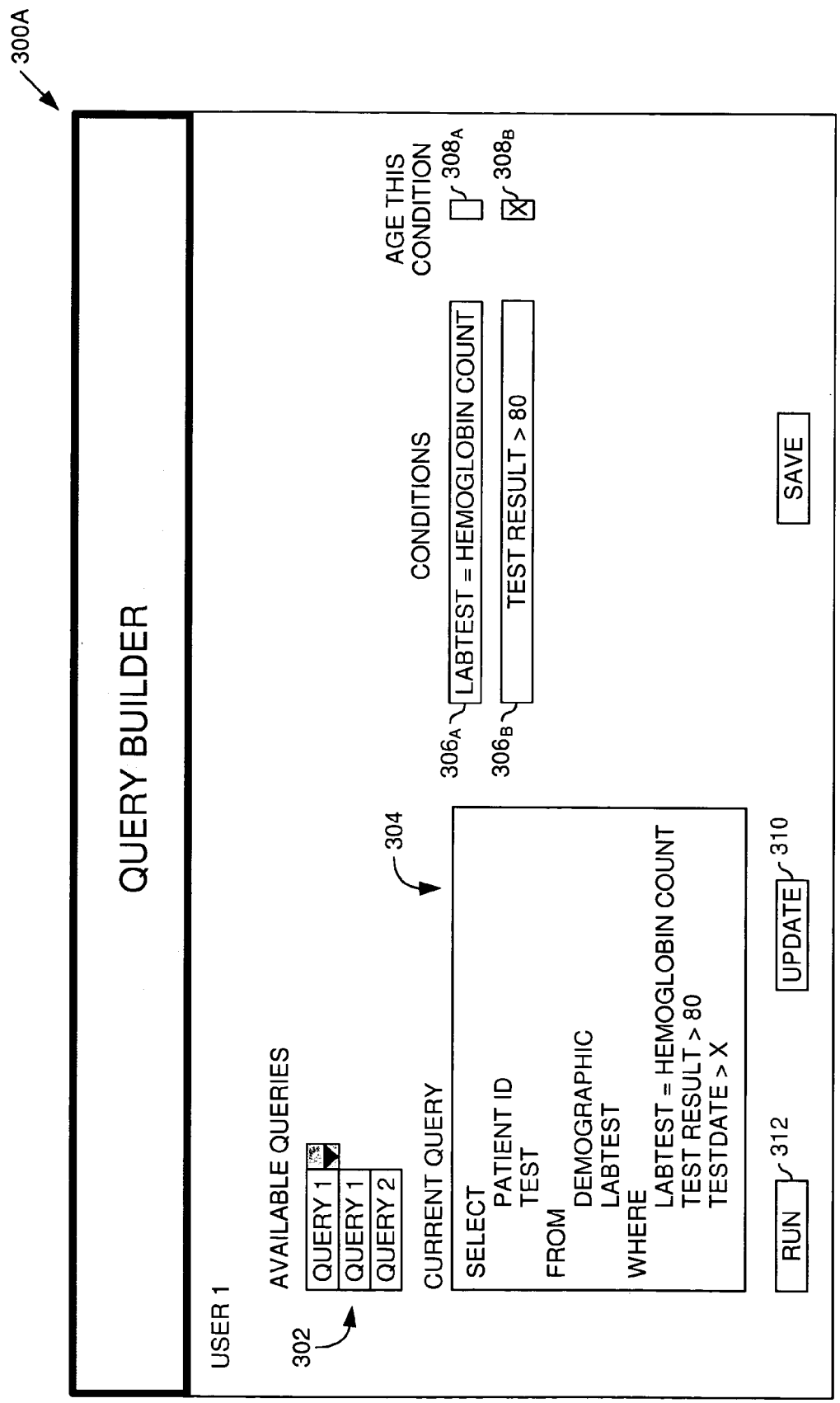
FIG. 4 is another representative screen of the query building interface of FIG. 1, and showing a second query generated from the first query by the addition of a temporal condition.

Upon composition of a new query, or editing an existing query (which also constitutes a new query for which a separate timestamp must be maintained) a user may elect to save the query by clicking the Save button 314, shown in FIG. 4. In one embodiment, clicking the Save button 314 invokes another screen (not shown) from the query building interface 102 in which a user may specify a query name and other configurable options. The query then becomes a persistent object (i.e., one of the saved queries 106) which may be retrieved at a later time (i.e., by selecting the query from the drop-down list 302). In this regard, it is noted that an aged query may be saved for subsequent retrieval and execution. Since an aged query already includes a temporal condition, subsequent execution with parameter aging may be expedited because the query conversion engine need not determine the time value field for the temporal condition. Instead, only the corresponding time value need be updated according to the current timestamp.

It is noted that the foregoing is merely illustrative and that other embodiments within the scope of the present invention are contemplated and will be recognized by those skilled in the art. For example, for purposes of illustration, the query building interface 102 is shown and described as a graphical user interface. However, is also contemplated that queries are managed and submitted for execution by an application(s). It is also contemplated that parameter aging is a selectable feature which may be temporarily or permanently turned off for given query, e.g., through interaction with an appropriate user interface element. Further, aged queries may be submitted in an automated fashion according to a predefined schedule, rather than in response to explicit user input. For example, a given query may be configured for daily execution at a specified time, where the temporal condition is updated with the timestamp of the previous execution of the query. In this way, each iterative execution of the query returns only those results which have been added to the database since the previous execution of the query.

Abstract Queries

According to one aspect, the queries submitted for execution by the query building interface 102 are abstract queries. An abstract query is composed using logical fields defined by a data abstraction model. Each logical field is mapped to one or more physical entities of data of an underlying data representation being used in the database 108 (e.g., XML, SQL, or other type representation). Furthermore, in the data abstraction model the logical fields are defined independently from the underlying data representation, thereby allowing queries to be formed that are loosely coupled to the underlying data representation. The abstract query can be configured to access the data and return query results, or to modify (i.e., insert, delete or update) the data. For execution against the database 108, the abstract query is transformed into a form (referred to herein as a concrete query) consistent with the underlying data representation of the data 162. Abstract queries and transformation of abstract queries into concrete queries is described in detail in the commonly owned, co-pending U.S. patent application Ser. No. 10/083,075, entitled "APPLICATION PORTABILITY AND EXTENSIBILITY THROUGH DATABASE SCHEMA AND QUERY ABSTRACTION," filed Feb. 26, 2002, which is incorporated by reference in its entirety.

Details of one embodiment in which abstract queries are used are now described with respect to FIGS. 5-8.

Figure 5A:
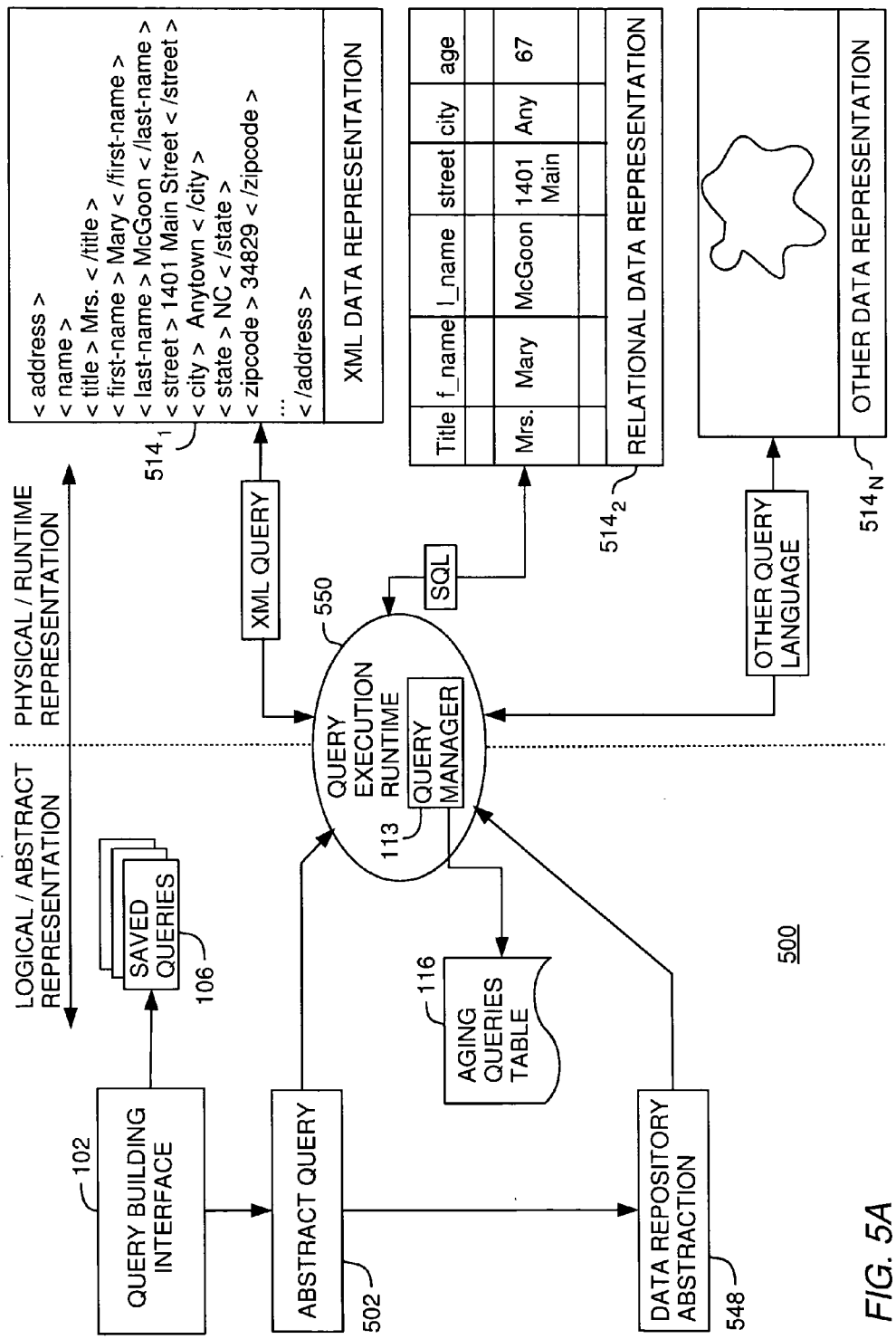
FIGS. 5A-5B show a plurality of interrelated components cooperating for the composition, issuance and transformation of abstract queries.
Figure 5B:
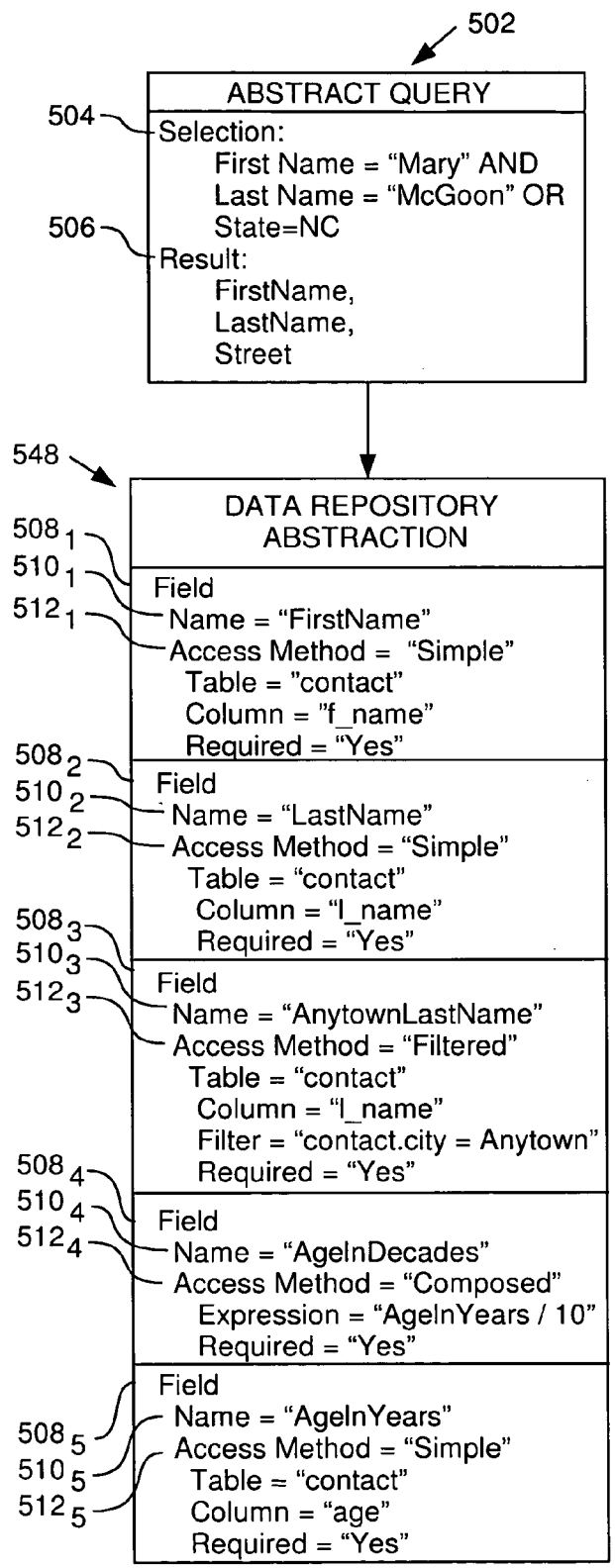

FIGS. 5A-B show a plurality of interrelated components cooperating for the composition, issuance and transformation of abstract queries. The query building interface 102 issues an abstract query 502 (i.e., corresponding to the current query 104 of FIG. 1) which may be have been composed by a user during a current session or may be one of the saved queries query 106. The issued query 502 is referred to herein as an "abstract query" because the query is composed according to abstract (i.e., logical) fields rather than by direct reference to the underlying physical data entities in the database 108. As a result, abstract queries may be defined that are independent of the particular underlying data representation used. In one embodiment, the query 502 may include both criteria used for data selection (selection criteria 504) and an explicit specification of the fields to be returned (return data specification 506) based on the selection criteria 504 (shown in FIG. 5B).

The logical fields used to compose the abstract query 502 are defined by a data repository abstraction component 548. In general, the data repository abstraction component 548 exposes information as a set of logical fields that may be used within a query (e.g., the abstract query 502) to specify criteria (i.e., the criteria 504) for data selection and specify the form of result data returned from a query operation (i.e., the return data specification 506). The logical fields are defined independently of the underlying data representation being used in the database 108, thereby allowing queries to be formed that are loosely coupled to the underlying data representation.

In general, the data repository abstraction component 548 comprises a plurality of field specifications $508_1$, $508_2$, $508_3$, $508_4$ and $508_5$ (five shown by way of example), collectively referred to as the field specifications 508. Specifically, a field specification is provided for each logical field available for composition of an abstract query. Each field specification comprises a logical field name $510_1$, $510_2$, $510_3$, $510_4$, $510_5$ (collectively, field name 510) and an associated access method $512_1$, $512_2$, $512_3$, $512_4$, $512_5$ (collectively, access method 512). The access methods associate (i.e., map) the logical field names to a particular physical data representation $514_1$, $514_2$ ... $514_N$ in a database (e.g., the database 108). By way of illustration, two data representations are shown, an XML data representation $514_1$ and a relational data representation $514_2$. However, the physical data representation $514_N$ indicates that any other data representation, known or unknown, is contemplated.

Any number of access methods are contemplated depending upon the number of different types of logical fields to be supported. In one embodiment, access methods for simple fields, filtered fields and composed fields are provided. The field specifications $508_1$, $508_2$ and $508_5$ exemplify simple field access methods $512_1$, $512_2$, and $512_5$, respectively. Simple fields are mapped directly to a particular entity in the underlying physical data representation (e.g., a field mapped to a given database table and column). By way of illustration, the simple field access method $512_1$ shown in FIG. 5B maps the logical field name $510_1$ ("FirstName") to a column named "f_name" in a table named "contact". The field specification $508_3$ exemplifies a filtered field access method $512_3$. Filtered fields identify an associated physical entity and provide rules used to define a particular subset of items within the physical data representation. An example is provided in FIG. 5B in which the filtered field access method $512_3$ maps the logical field name $510_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $508_4$ exemplifies a composed field access method $512_4$. Composed access methods compute a logical field from one or more physical fields using an expression supplied as part of the access method definition. In this way, information which does not exist in the underlying data representation may computed. In the example illustrated in FIG. 5B the composed field access method $512_3$ maps the logical field name $510_3$ "AgeInDecades" to "AgeInYears/10". Another example is a sales tax field that is composed by multiplying a sales price field by a sales tax rate.

It is noted that the data repository abstraction component 548 shown in FIG. 5B is merely illustrative of selected logical field specifications and is not intended to be comprehensive. As such, the abstract query 502 shown in FIG. 5B includes some logical fields for which specifications are not shown in the data repository abstraction component 548, such as "State" and "Street".

It is contemplated that the formats for any given data type (e.g., dates, decimal numbers, etc.) of the underlying data may vary. Accordingly, in one embodiment, the field specifications 508 include a type attribute which reflects the format of the underlying data. However, in another embodiment, the data format of the field specifications 508 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 508 of the data repository abstraction component 548 shown in FIG. 5A are representative of logical fields mapped to data represented in the relational data representation $514_2$. However, other instances of the data repository abstraction component 548 map logical fields to other physical data representations, such as XML. Further, in one embodiment, a data repository abstraction component 548 is configured with access methods for procedural data representations.

An illustrative abstract query corresponding to the abstract query 502 shown in FIG. 5 is shown in Table I below. By way of illustration, the data repository abstraction 548 is defined using XML. However, any other language may be used to advantage.

TABLE I

QUERY EXAMPLE

```
001  <?xml version="1.0"?>
002  <!--Query string representation: (FirstName = "Mary" AND LastName =
003  "McGoon") OR State = "NC"-->
004  <QueryAbstraction>
005      <Selection>
006          <Condition internalID="4">
007              <Condition field="FirstName" operator="EQ" value="Mary"
008  internalID="1"/>
009              <Condition field="LastName" operator="EQ" value="McGoon"
010  internalID="3" relOperator="AND"></Condition>
011          </Condition>
012          <Condition field="State" operator="EQ" value="NC" internalID="2"
013  relOperator="OR"></Condition>
014      </Selection>
015      <Results>
016          <Field name="FirstName"/>
017          <Field name="LastName"/>
018          <Field name="State"/>
019      </Results>
020  </QueryAbstraction>
```

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a data repository abstraction component 548 corresponding to the abstract query in Table I is shown in Table II below. By way of illustration, the data repository abstraction component 548 is defined using XML. However, any other language may be used to advantage.

Note that lines 004-009 correspond to the first field specification $508_1$ of the DRA 548 shown in FIG. 5B and lines 010-015 correspond to the second field specification $508_2$. For brevity, the other field specifications defined in Table I have not been shown in FIG. 5B. Note also that Table I illustrates a category, in this case "Demographic". A category is a grouping of one or more logical fields. In the present example, "First Name", "Last Name" and "State" are logical fields belonging to the common category, "Demographic".

In the case of ageable fields additional information may be added to the respective field specifications. For example, the Lab Test field may be defined in XML as follows:

TABLE II

DATA REPOSITORY ABSTRACTION EXAMPLE

```
001  <?xml version="1.0"?>
002  <DataRepository>
003      <Category name="Demographic">
004          <Field queryable="Yes" name="FirstName" displayable="Yes">
005              <AccessMethod>
006                  <Simple columnName="f_name" tableName="contact"></Simple>
007              </AccessMethod>
008              <Type baseType="char"></Type>
009          </Field>
010          <Field queryable="Yes" name="LastName" displayable="Yes">
011              <AccessMethod>
012                  <Simple columnName="l_name" tableName="contact"></Simple>
013              </AccessMethod>
014              <Type baseType="char"></Type>
015          </Field>
016          <Field queryable="Yes" name="State" displayable="Yes">
017              <AccessMethod>
018                  <Simple columnName="state" tableName="contact"></Simple>
019              </AccessMethod>
020              <Type baseType="char"></Type>
021          </Field>
022      </Category>
023  </DataRepository>
```

```
001   </Field>
002   <Field queryable="Yes" name="LabTest" displayable="Yes">
003       <AccessMethod>
004           <Simple columnName="Test_Name" tableName="Lab Test">
005           </Simple>
006        </AccessMethod>
007       <Aged agedBasedOn="data://Test/TestDate"/>
008           <Type baseType="char"></Type>
009   </Field>
```

In this example, line 007 specifies an indicator that the LabTest field is aged, and also specifies the temporal field, TestDate, on the basis of which LabTest is aged.

Abstract queries are transformed into concrete queries, by a runtime component 550, and then executed. The transformation of abstract queries into concrete queries is described in detail below. In one embodiment, the runtime component 550 is also responsible for converting the query into an aged query having a temporal condition, as described above. Accordingly, the runtime component 550 shown in FIG. 5B includes the query manager 113 of FIG. 1.

Figure 6:
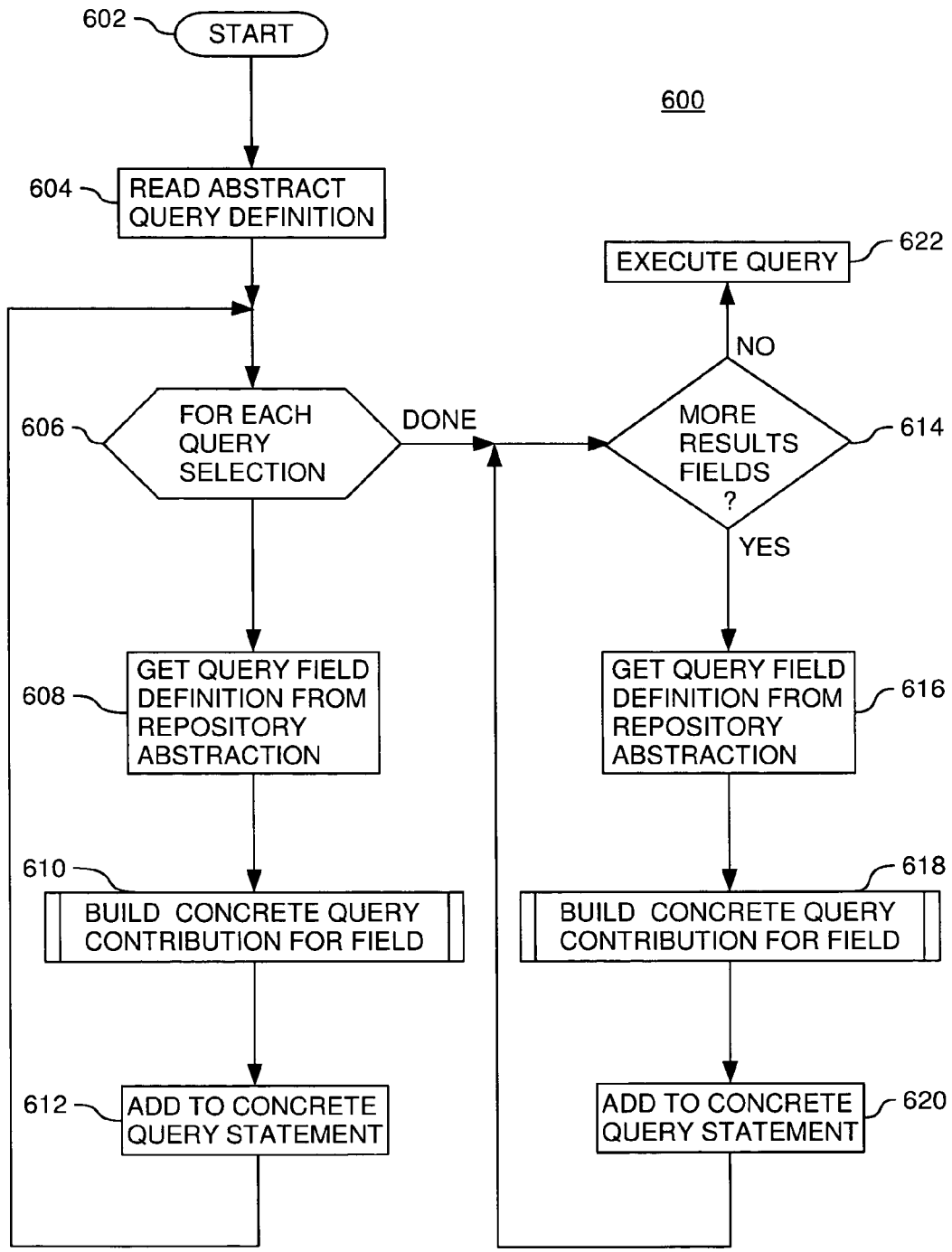
FIG. 6 is an illustrative runtime method exemplifying one embodiment of the operation of the runtime component.

FIG. 6 shows an illustrative runtime method 600 exemplifying one embodiment of the operation of the runtime component 550. The method 600 is entered at step 602 when the runtime component 550 receives as input an instance of an abstract query (such as the abstract query 502 shown in FIG. 5B). At step 604, the runtime component 550 reads and parses the instance of the abstract query and locates individual selection criteria and desired result fields. At step 606, the runtime component 550 enters a loop (comprising steps 606, 608, 610 and 612) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 608, the runtime component 550 uses the field name from a selection criterion of the abstract query to look up the definition of the field in the data repository abstraction 132. As noted above, the field definition includes a definition of the access method used to access the physical data associated with the field. The runtime component 550 then builds (step 610) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The Concrete Query Contribution generated for the current field is then added to a Concrete Query Statement. The method 600 then returns to step 606 to begin processing for the next field of the abstract query. Accordingly, the process entered at step 606 is iterated for each data selection field in the abstract query, thereby contributing additional content to the eventual query to be performed.

After building the data selection portion of the concrete query, the runtime component 550 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 600 enters a loop at step 614 (defined by steps 614, 616, 618 and 620) to add result field definitions to the concrete query being generated. At step 616, the runtime component 550 looks up a result field name (from the result specification of the abstract query) in the data repository abstraction 132 and then retrieves a Result Field Definition from the data repository abstraction 132 to identify the physical location of data to be returned for the current logical result field. The runtime component 550 then builds (as step 618) a Concrete Query Contribution (of the concrete query that identifies physical location of data to be returned) for the logical result field. At step 620, Concrete Query Contribution is then added to the Concrete Query Statement. Once each of the result specifications in the abstract query has been processed, the query is executed at step 622.

Figure 7:
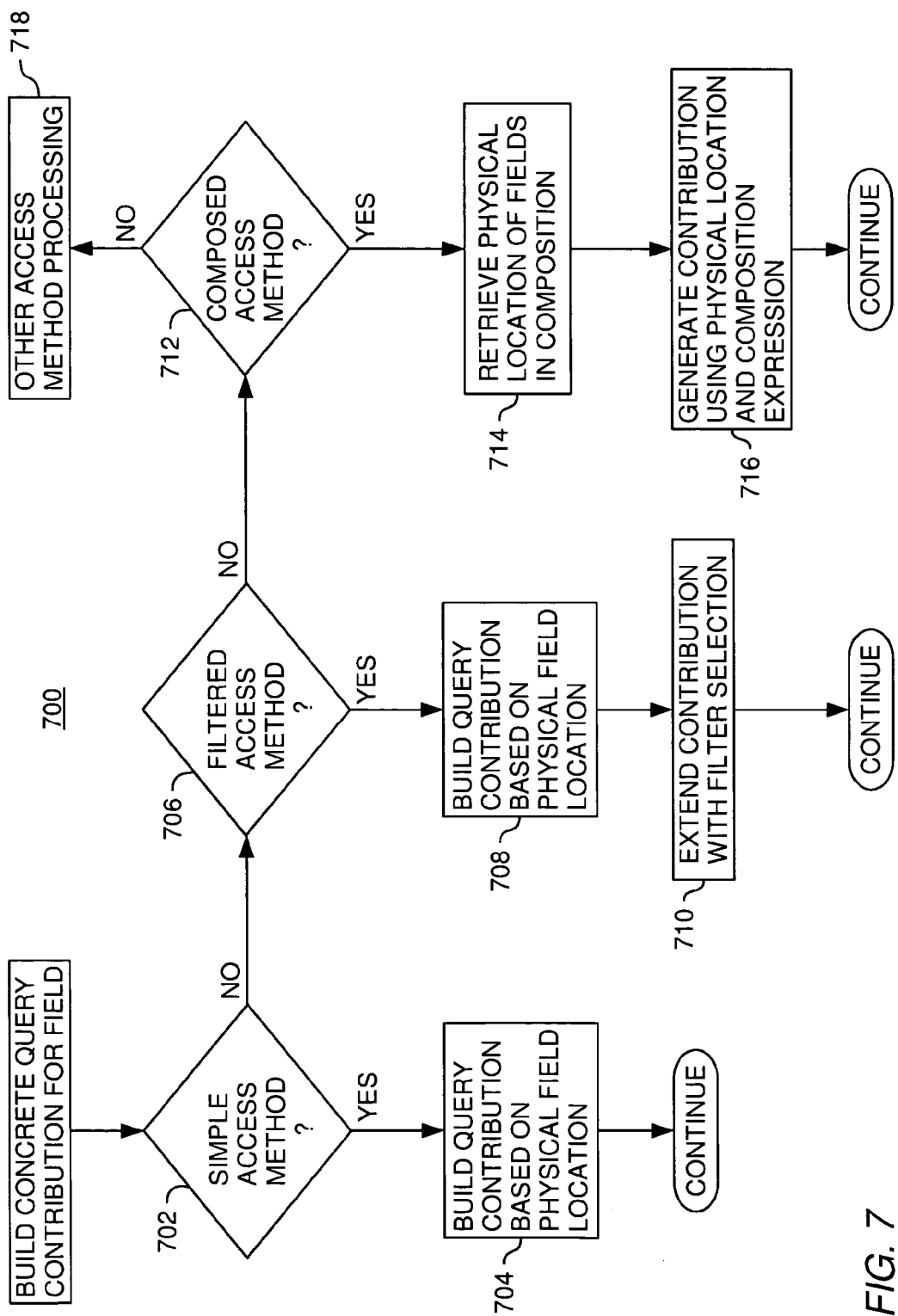
FIG. 7 illustrates one embodiment of a method for building a Concrete Query Contribution for a logical field.

One embodiment of a method 700 for building a Concrete Query Contribution for a logical field according to steps 610 and 618 is described with reference to FIG. 7. At step 702, the method 700 queries whether the access method associated with the current logical field is a simple access method. If so, the Concrete Query Contribution is built (step 704) based on physical data location information and processing then continues according to method 600 described above. Otherwise, processing continues to step 706 to query whether the access method associated with the current logical field is a filtered access method. If so, the Concrete Query Contribution is built (step 708) based on physical data location information for some physical data entity. At step 710, the Concrete Query Contribution is extended with additional logic (filter selection) used to subset data associated with the physical data entity. Processing then continues according to method 600 described above.

If the access method is not a filtered access method, processing proceeds from step 706 to step 712 where the method 700 queries whether the access method is a composed access method. If the access method is a composed access method, the physical data location for each sub-field reference in the composed field expression is located and retrieved at step 714. At step 716, the physical field location information of the composed field expression is substituted for the logical field references of the composed field expression, whereby the Concrete Query Contribution is generated. Processing then continues according to method 600 described above.

If the access method is not a composed access method, processing proceeds from step 712 to step 718. Step 718 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 700. For example, the conversion may be performed as part of, or immediately following, the steps 704, 708 and 716. A subsequent conversion from the format of the physical data to the format of the logical field is performed after the query is executed at step 622. Of course, if the format of the logical field definition is the same as the underlying physical data, no conversion is necessary.

Event Profiles

In one embodiment, aging parameters are used in tandem with "event profiles". Event profiles are conditions about conditions with a temporal context in the database. For example, while a condition finds people that had Test x and are over 40 years old, an event profile finds people that had text x when they were over 40 years old. It is possible to apply an aging parameter to an event profile as well. When this is done, the query will return people that newly fit the query each time. Conceptually, the query will return all people that had the test while over 40 since the last time the query was run. This would eliminate from the results people that had the test since the last query execution, but were younger than 40. Event profiles are described in detail in the commonly owned, co-pending U.S. patent application Ser. No. 10/094,531, entitled "GRAPHICAL USER INTERFACE TO BUILD EVENT-BASED DYNAMIC SEARCHES OR QUERIES USING EVENT PROFILES", filed Mar. 08, 2002, which is incorporated by reference in its entirety.

While the foregoing is directed to embodiments of the present invention, other and further embodiments of the invention may be devised without departing from the basic scope thereof, and the scope thereof is determined by the claims that follow.

What is claimed is:

1. A computer-implemented method for performing queries based on aging result fields by operation of one or more computer processors, the method comprising:
    executing a first query, the first query comprising:
        one or more fields for which values of a database are to be returned in a first result set upon execution of the first query; and
        one or more conditions each containing one or more result fields, the one or more conditions defining logic for restricting the values to be returned upon execution of the first query;
    storing a timestamp indicative of a time at which the first query is executed;
    returning the first result set for the first query;
    storing the executed first query in a storage medium;
    retrieving the stored first query from the storage medium;
    designating at least one of the result fields of the retrieved first query as an aging parameter, wherein each result field designated as an aging parameter has an associated time value field; and
    for each designated aging parameter, programmatically adding, by operation of a query conversion engine executing on one or more of the computer processors, a temporal condition to the retrieved first query to produce a second query; wherein each temporal condition comprises the respective associated time value field and a value corresponding to the timestamp, whereby results returned for the respective aging parameter are limited to those having time values more recent than the timestamp.

2. The method of claim 1, further comprising:
    successively executing the second query multiple times; and
    updating the timestamp for each execution of the second query.

3. The method of claim 1, further comprising:
    executing the second query; and
    returning a second result set for the second query, the second result set including all the results that satisfy the first query and are not redundant with respect to the first set.

4. The method of claim 1, further comprising:
    executing the second query;
    storing a timestamp indicative of a time at which the second query is executed;
    at a later time, receiving a request to execute the second query again; and
    for each designated aging parameter, programmatically updating the temporal condition on the basis of the timestamp indicative of the time at which the second query was last executed.

5. The method of claim 1, wherein the first query and second queries are initially constructed as abstract queries comprising logical fields abstractly representing physical data and further comprising:
    converting the abstract queries into executable queries.

6. The method of claim 1, wherein designating at least one of the result fields as the aging parameter is done in response to user input to a user interface.

7. The method of claim 1, wherein the designation of at least one of the result fields as the aging parameter is located in a data structure and is not done in response to user input to a user interface.

8. The method of claim 1, further comprising:
    updating the timestamp for each execution of the second query; and
    updating the temporal condition for each execution of the second query on the basis of the timestamp for the immediately previous execution of the second query.

9. The method of claim 1, further comprising:
    storing the timestamp to a table record; and
    storing a user identifier to the table record.

10. The method of claim 1, wherein the temporal condition comprises the associated time value field, an arithmetic operator and a time value.

11. A computer system, comprising:
    a database stored in a computer readable storage medium;
    an aging parameter table in which each row comprises a query and a timestamp indicating the time at which the query was last executed, wherein the query has a result field capable of being temporarily restricted; and
    a query manager configured to:
        store the query in the aging parameter table;
        perform a query execution operation repeatedly; wherein the query execution operation comprises:
            retrieving stored query from the aging parameter table; and
            adding a temporal condition to the retrieved query to generate a modified retrieved query, the temporal condition being applied to the result field and including the timestamp for the immediately previous execution of the query, whereby results returned for the result field are limited to those having time values more recent than the timestamp; and updating the timestamp in the aging parameter table to reflect the time at which the modified retrieved query is executed.

12. The computer system of claim 11, wherein the temporal condition is added to the retrieved query in response to user input designating the result field as an aging parameter.

13. The computer system of claim 11, further comprising a user interface having a selection element allowing a user to designate the result field as an aging parameter, the designation prompting the query manager to add the temporal condition.

14. The computer system of claim 11, further comprising a user interface configured to allow a user to modify the timestamp to an arbitrary value and thereby control the time range for which results satisfying the query are returned.

15. A computer readable storage medium containing a program which when executed by a computer processor, performs an operation comprising:

executing a first query, the first query comprising:
one or more fields for which values of a database are to be returned in a first result set upon execution of the first query; and
one or more conditions each containing one or more result fields, the one or more conditions defining logic for restricting the values to be returned upon execution of the first query;

storing a timestamp indicative of a time at which the first query is executed;

returning the first result set for the first query;

storing the executed first query in a storage medium;

retrieving the stored first query from the storage medium;

designating at least one of the result fields of the retrieved first query as an aging parameter, wherein each result field designated as an aging parameter has an associated time value field; and for each designated aging parameter, programmatically adding, by operation of a query conversion engine executing on the computer processor, a temporal condition to the retrieved first query to produce a second query; wherein each temporal condition comprises the respective associated time value field and a value corresponding to the timestamp, whereby results returned for the respective aging parameter are limited to those having time values more recent than the timestamp.

16. The computer readable storage medium of claim 15, further comprising:
successively executing the second query multiple times; and
updating the timestamp for each execution of the second query.

17. The computer readable storage medium of claim 15, further comprising:
executing the second query; and
returning a second result set for the second query, the second result set including all the results that satisfy the first query and are not redundant with respect to the first set.

18. The computer readable storage medium of claim 15, further comprising:
executing the second query;
storing a timestamp indicative of a time at which the second query is executed;
at a later time, receiving a request to execute the second query again; and
for each designated aging parameter, programmatically updating the temporal condition on the basis of the timestamp indicative of the time at which the second query was last executed.

19. The computer readable storage medium of claim 15, wherein designating at least one of the result fields as the aging parameter is done in response to user input to a user interface.

20. The computer readable storage medium of claim 15, wherein the designation of at least one of the result fields as the aging parameter is located in a data structure and is not done in response to user input to a user interface.

21. The computer readable storage medium of claim 15, further comprising:
updating the timestamp for each execution of the second query; and
updating the temporal condition for each execution of the second query on the basis of the timestamp for the immediately previous execution of the second query.

* * * * *

UNITED STATES PATENT AND TRADEMARK OFFICE
CERTIFICATE OF CORRECTION

PATENT NO. : 7,606,791 B2 Page 1 of 1
APPLICATION NO. : 10/860417
DATED : October 20, 2009
INVENTOR(S) : Dettinger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 380 days.

Signed and Sealed this

Fourteenth Day of December, 2010

David J. Kappos
*Director of the United States Patent and Trademark Office*